United States Patent
Mielke

(10) Patent No.: US 7,973,807 B2
(45) Date of Patent: *Jul. 5, 2011

(54) SNAP TO ELEMENT ANALYTICAL TOOL

(75) Inventor: Markus W. Mielke, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/715,279

(22) Filed: Mar. 1, 2010

(65) Prior Publication Data

US 2010/0149217 A1    Jun. 17, 2010

Related U.S. Application Data

(63) Continuation of application No. 11/275,617, filed on Jan. 19, 2006, now Pat. No. 7,705,861.

(51) Int. Cl.
*G09G 5/00* (2006.01)
*G06F 3/048* (2006.01)

(52) U.S. Cl. ........ 345/642; 345/661; 345/667; 715/801; 715/800; 715/252

(58) Field of Classification Search .......................... None
See application file for complete search history.

(56) References Cited

U.S. PATENT DOCUMENTS

| | | | |
|---|---|---|---|
| 5,187,776 A | 2/1993 | Yanker | |
| 5,341,466 A | 8/1994 | Perlin et al. | |
| 5,592,248 A | 1/1997 | Norton et al. | |
| 5,596,346 A | 1/1997 | Leone et al. | |
| 5,796,401 A * | 8/1998 | Winer | 345/619 |
| 5,798,752 A | 8/1998 | Buxton et al. | |
| 6,034,661 A | 3/2000 | Servan-Scheiber et al. | |
| 6,724,403 B1 * | 4/2004 | Santoro et al. | 715/765 |
| 6,826,727 B1 * | 11/2004 | Mohr et al. | 715/235 |
| 6,992,685 B2 | 1/2006 | Hallbauer et al. | |
| 7,075,512 B1 | 7/2006 | Fabre et al. | |
| 7,423,660 B2 | 9/2008 | Ouchi et al. | |
| 7,450,114 B2 | 11/2008 | Anwar | |
| 7,487,447 B1 * | 2/2009 | Jerger | 715/252 |
| 7,551,187 B2 | 6/2009 | Agrawala et al. | |
| 7,705,861 B2 | 4/2010 | Mielke | |
| 2004/0225968 A1 | 11/2004 | Look et al. | |
| 2006/0008779 A1 | 1/2006 | Shand et al. | |
| 2006/0050091 A1 | 3/2006 | Shoemaker et al. | |
| 2006/0064647 A1 * | 3/2006 | Tapuska et al. | 715/800 |
| 2006/0107225 A1 | 5/2006 | Jones et al. | |
| 2006/0265653 A1 | 11/2006 | Paasonen et al. | |
| 2007/0143082 A1 * | 6/2007 | Degnan | 703/1 |

OTHER PUBLICATIONS

"Final Office Action", U.S. Appl. No. 11/275,617, (May 19, 2008), 10 pages.
"Final Office Action", U.S. Appl. No. 11/275,617, (Jul. 28, 2009), 17 pages.
"JR Screen Ruler", *Spadix Software*, Available at <www.spadixbd.com>, (2000-2005), 4 pages.

(Continued)

*Primary Examiner* — M Good Johnson

(57) ABSTRACT

An analytical tool for measuring spacing between elements in a web page is provided. In one implementation, the analytical tool identifies locations indicated on a web page and automatically determines one or more elements in proximity to those indicated locations. The analytical tool automatically identifies points on the determined elements associated with the indicated locations and calculates the distance between those points. The calculated distance is displayed on the web page. The automatically identified points and a graphical representation of a measuring ruler between the points may also be displayed to enhance usability.

20 Claims, 5 Drawing Sheets

OTHER PUBLICATIONS

"Non Final Office Action", U.S. Appl. No. 11/257,617, (Feb. 27, 2009),12 pages.

"Non-Final Office Action", U.S. Appl. No. 11/275,617, (Sep. 18, 2008),11 pages.

"Non-Final Office Action", U.S. Appl. No. 11/275,617, (Sep. 20, 2007),11 pages.

"Notice of Allowance", U.S. Appl. No. 11/275,617, (Dec. 15, 2009),4 pages.

"PDF Measure It 1.01", Available at <http://fileforum.betanews.com>,(2002),2 pages.

"Perfect Screen Ruler 1.5 Screenshots", Available at<www.softpedia.com>,(2001-2007),3 pages.

"Perfect Screen Ruler 1.5", Available at <www.styopkin.com>,(2001-2007),2 pages.

"Snapping Tape Measure", Retrieved from: <http://www.strumapgis.co.uk/htmlhelp/SNAPPINGATAPEMEASURE.html> on Sep. 12, 2007, (Mar. 7, 2007),2 pages.

Cole, Tim "InDesign Techniques: Getting the Most out of Guides", Retrieved from: <http://digitalmediadesigner.com/2003/09_sep/tutorials/inguides030917.htm> on Sep. 12, 2007, (Sep. 2003),5 pages.

* cited by examiner

SNAP TO ELEMENT ANALYTICAL TOOL

RELATED APPLICATION

This application is a continuation of and claims priority to U.S. patent application Ser. No. 11/275,617 entitled "Snap To Element Analytical Tool" filed Jan. 19, 2006 to Mielke, the disclosure of which is incorporated by reference herein in its entirety.

BACKGROUND

Technologies such as Cascading Style Sheets have given web designers increased control over the layouts of web pages. With these new technologies, elements in a web page do not have to be aligned from either the left or the right margin of the page. Instead, elements can now be positioned in any location, such as a number of pixels from the top, bottom, left or right. This increase in flexibility has led to many new and visually appealing web page design techniques. However, the positioning flexibility has also caused an increase in design complexity.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides an analytical tool for measuring spacing between elements in a web page. The analytical tool provides a ruler that automatically snaps to one or more elements in the web page for measurement. In one implementation, the analytical tool identifies locations indicated on a web page and automatically determines one or more elements in proximity to those indicated locations. The analytical tool automatically identifies points on the determined elements associated with the indicated locations and calculates the distance between those points. The calculated distance is displayed on the web page. The automatically identified points and a graphical representation of a measuring ruler between the points may also be displayed to enhance usability.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for measuring elements in a web page, the system described is provided as an example and not a limitation. As those skilled in the art will appreciate, the present examples are suitable for application in a variety of different types of systems that are capable of measuring the dimension of an element and the distance between elements in a graphically rendered document.

Figure 1:
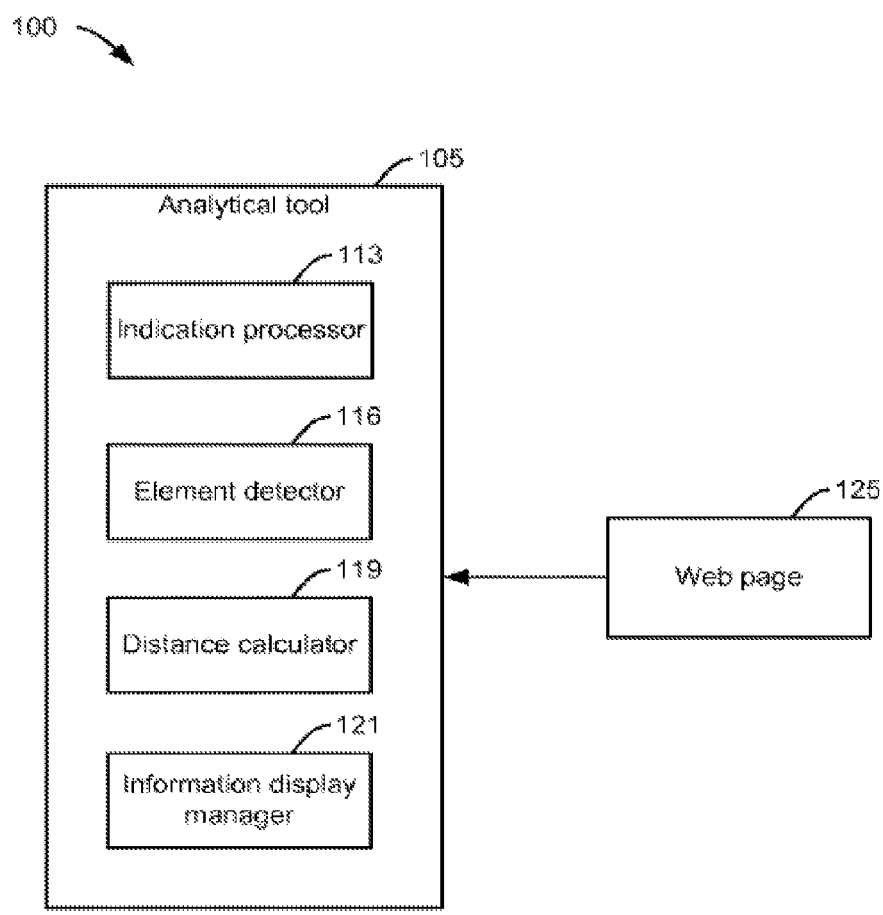
FIG. 1 shows an example system for analyzing a web page.

FIG. 1 shows an example system 100 for analyzing a web page. Analytical tool 105 is an executable component for measuring distances between points in web page 125. Analytical tool 105 may be an independent component or a part of another executable component. For example, in one example implementation, analytical tool 105 is a utility of a web browser. As shown in FIG. 1, analytical tool 105 may include indication processor 113, element detector 116, distance calculator 119, and information display manager 121.

Indication processor 113 is configured to identify locations that are indicated on a web page. For example, a user may use a pointing device to indicate two locations on the web page for measurement. The locations may also be provided by other executable components associated with the analytical tool 105. Typically, indication processor 113 identifies the locations by pixel coordinates in the web page.

Element detector 116 is configured to determine the elements that are in proximity to the locations identified by indication processor 113. In one implementation, element detector 116 is configured to identify an element within a predetermined distance from an indicated location. For example, element detector 116 may identify the element that is within 3 pixels of a location in the web page indicated by a user. Element detector 116 is also configured to determine a point on the identified element associated with the indicator location. The determined point typically is the most appropriate location in the element for measurement purposes. For example, the determined point may be on an edge of the identified element closest to the indicated location.

Distance calculator 119 is configured to calculate the distance between two points determined by element detectors 116 in one or more identified elements. The determined points may be on different elements but may also be on the same element. For example, two determined points may be on different edges of the same element. Distance calculator 119 is configured to obtain the coordinates of two determined points and calculates the distance between the points from the coordinates. The distance calculator 119 may determine the distance in any unit, such as pixel width, inches, centimeters, or the like.

Information display manager 121 is configured to display information provided by analytical tool 105. The information typically includes the distance between locations indicated on the web page. The information may also include the coordinates of the points automatically determined by element detector 116. The information may also include graphical aids. For example, a ruler may be displayed on the web page between the automatically determined points.

Analytical tool 105 may provide selectable options that further enhance usability. For example, analytical tool 105 may enable the selection the measurement be performed on the vertical or horizontal axes so that vertical or horizontal measurements can be automatically made. Analytical tool 105 may also enable a user to select the color of the ruler and whether to display tick marks and end points of the ruler. Analytical tool 105 may further enable the user to activate a zoom display area that magnifies a particular section of the web page so that the user can more accurately indicate the locations on the web page for measurement within the zoom display area.

Analytical tool 105 described above enables a user to accurately select points on a web page for measurement. Particularly, analytical tool 105 automatically determines the points on one or more elements from locations indicated by the user on the web page. Thus, the end points of a measurement are automatically snapped to elements proximate to the indicated locations. This functionality allows the user to select two meaningful points for measurement by merely indicating locations that are proximate to those points. Since the points are automatically snapped to elements on the web page, the performed measurement is highly accurate, without requiring the user to actually indicate the exact positions of the points on the web page.

Figure 2:
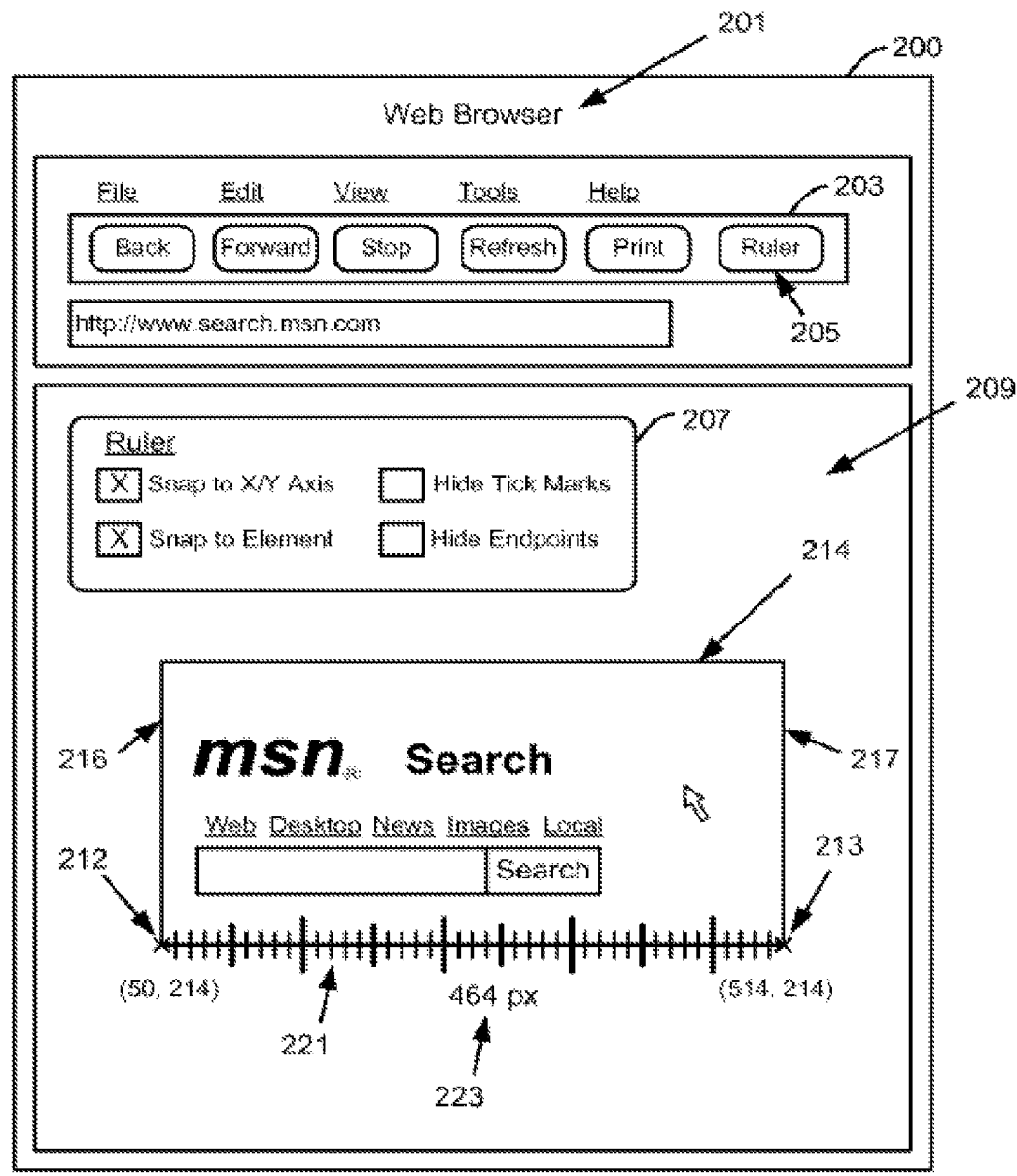
FIG. 2 shows a screenshot of an example user-interface for a snap to element analytical tool.

FIG. 2 shows a screenshot 200 of an example user-interface for a snap to element analytical tool. The example analytical tool in FIG. 2 is shown as a ruler utility of a web browser 201. As discussed above, the analytical tool may also be incorporated into other types of applications or may execute as an independent component.

As shown in FIG. 2, web browser 201 includes tool bar 203 containing selectors for activating functionalities of web browser 201. In this example, tool bar 203 includes selector 205 for activating the ruler utility, which can be used to measure distances in web page 209, such as the distance between features in an element or the distance between different elements. When selector 205 is activated, the ruler utility provides option interface 207 for selecting different options offered by the rule utility. In the example, a "Snap to Element" option is selected, which enables the points between which a distance is calculated to be automatically snapped to an element in proximity to indicated locations on web page 209. Option interface 207 also includes a "Snap to XY Axis" option that automatically allows vertical and horizontal distances to be measured, a "Hide Tick Marks" option that hides the marks on the ruler, and a "Hide Endpoints" option that hides the determined points on the web page.

Screenshot 200 shows the ruler utility being used to measure element 214, which is a search box display feature of web page 209. As shown in FIG. 2, element 214 includes edges 216 and 217. A user may indicate the sides of element 214 for measuring. For example, the user may use a mouse to select locations proximate to edges 216 and 217. The ruler utility automatically determines points 212 and 213, which are located on the ends of edges 216 and 217. The ruler utility calculates the distance value between determined points 212-213 and displays value 223 on the web page, which is in pixel units in this example. As shown in screenshot 200, the ruler utility also displays a graphical ruler 221 on the web page between points 212-213. The rule utility further displays the coordinates of points 212-213 for user reference.

Figure 3:
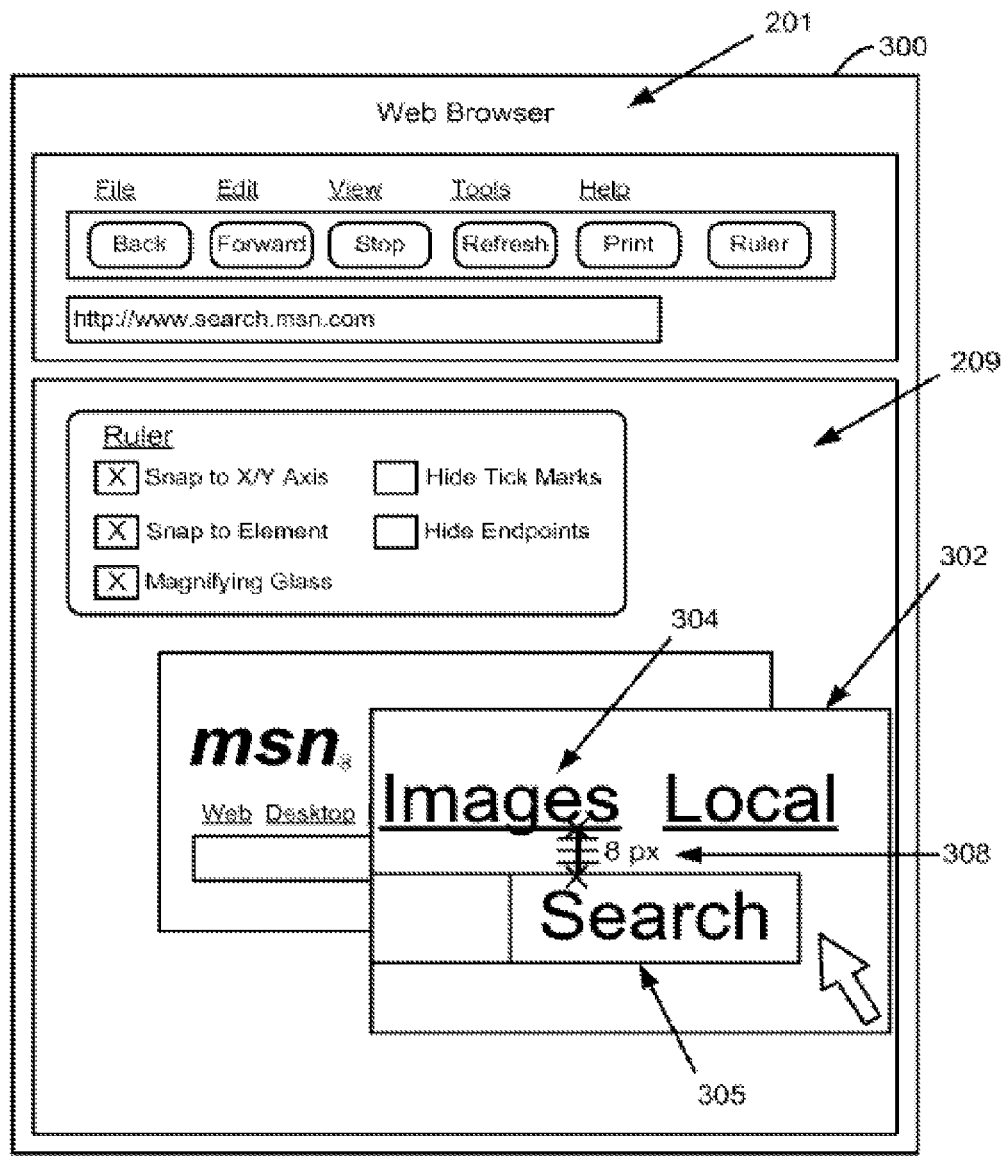
FIG. 3 shows another screenshot of example a web browser with a snap to element analytical tool.

FIG. 3 shows another screenshot 300 of example web browser 201 with a snap to element analytical tool. As shown in FIG. 3, the ruler utility provides a zoom display area 302 to aid the user to indicate locations in web page 209 for measurement. Zoom display area 302 may be activated by a user or automatically by the ruler utility. In this example, the indicated locations are determined to be points on elements 304-305. The distance between elements 304-305 is calculated and the distance information 308 is displayed on the web page 209.

Figure 4:
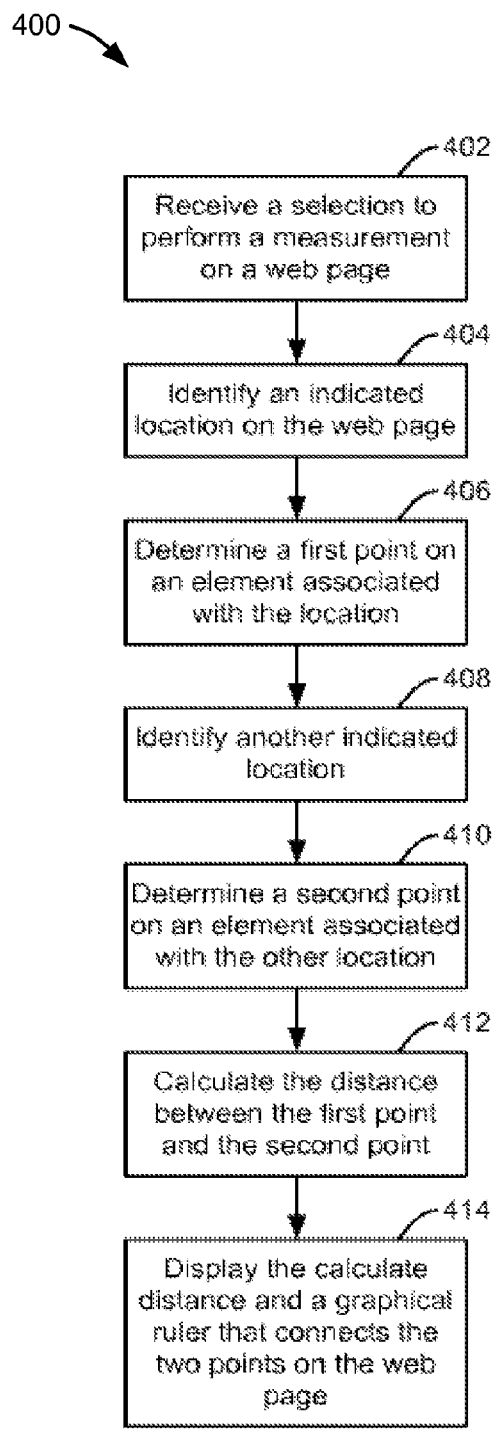
FIG. 4 shows an example process for measuring distance between points on a web page that are automatically determined based on locations indicated by a user.

FIG. 4 shows an example process 400 for measuring distance between points on a web page that are automatically determined based on locations indicated by a user. Process 400 may be implemented by an analytical tool with snap to element functionalities. The analytical tool may be incorporated into a web browser or other applications, or may function as an independent component. At block 402, a selection to perform a measurement on a web page is received. At block 404, a location on the web page is identified. The location is typically provided by a user as an indication on the web page using a pointing device. At block 406, a first point in an element associated with the location is determined. For example, an element within a predetermined distance (e.g. 1-10 pixels) from the indicated location may be automatically identified.

At block 408, another indicated location may be identified. At block 410, a second point in an element associated with the other indicated location is determined. The second point may be on the same or different element from the element on which the first point is located. At block 412, the distance between the first point and second point is calculated. At block 414, the calculated distance is displayed on the web page. A graphical representation of a ruler may also be displayed. The ruler may connect the first and second points on the web page.

Figure 5:
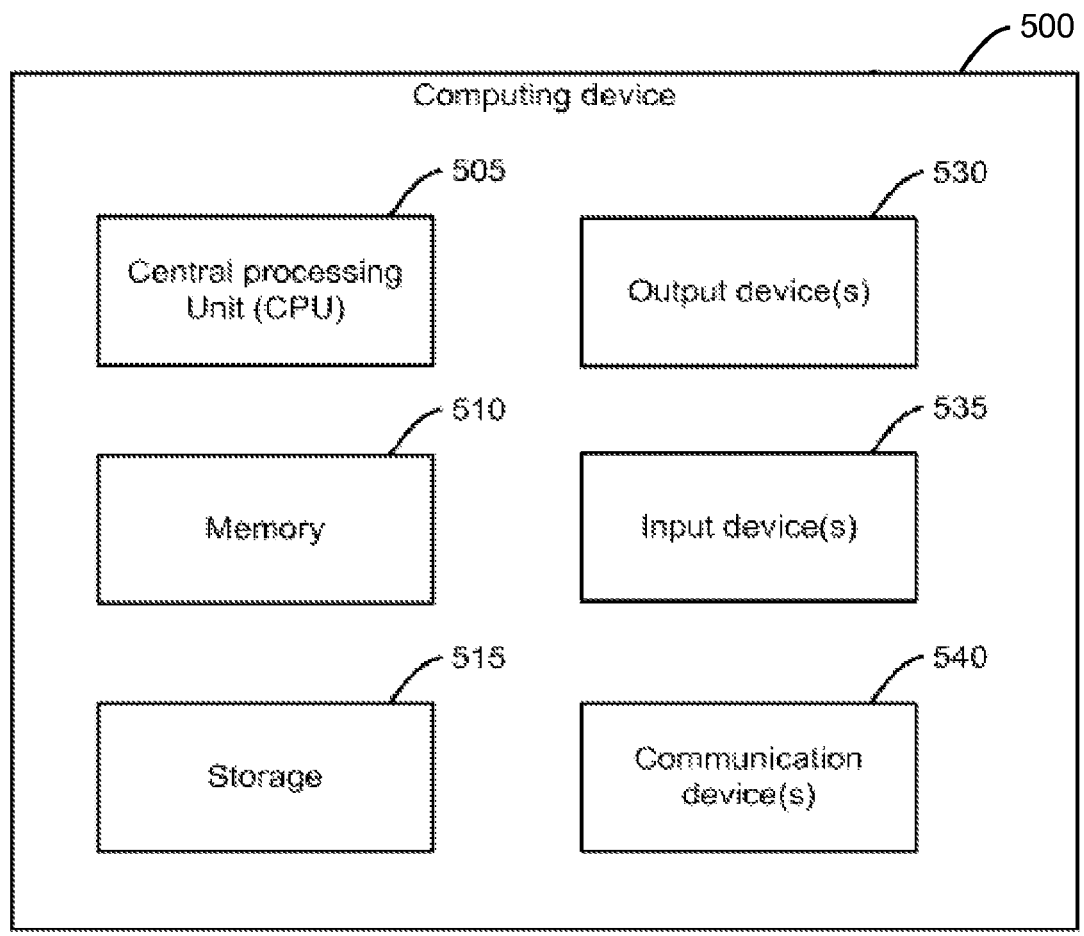
FIG. 5 shows an example computer device for implementing the described systems and methods.

FIG. 5 shows an example computer device 500 for implementing the described systems and methods. In its most basic configuration, computing device 500 typically includes at least one central processing unit (CPU) 505 and memory 510.

Depending on the exact configuration and type of computing device, memory 510 may be volatile (such as RAM), non-volatile (such as ROM, flash memory, etc.) or some combination of the two. Additionally, computing device 500 may also have additional features/functionality. For example, computing device 500 may include multiple CPU's. The described methods may be executed in any manner by any processing unit in computing device 500. For example, the described process may be executed by both multiple CPU's in parallel.

Computing device 500 may also include additional storage (removable and/or non-removable) including, but not limited to, magnetic or optical disks or tape. Such additional storage is illustrated in FIG. 5 by storage 515. Computer storage media includes volatile and nonvolatile, removable and non-removable media implemented in any method or technology for storage of information such as computer readable instructions, data structures, program modules or other data. Memory 510 and storage 515 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 500. Any such computer storage media may be part of computing device 500.

Computing device 500 may also contain communications device(s) 540 that allow the device to communicate with other devices. Communications device(s) 540 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 500 may also have input device(s) 535 such as keyboard, mouse, pen, voice input device, touch input device, etc. Output device(s) 530 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A computer-implemented method, comprising:
    activating a zoom display area to display a section of a web page at a greater magnification level than a remainder of the web page;
    zooming a magnification level of one or more elements displayed in the zoom display area to the greater magnification level which displays the one or more elements in the zoom display area at a different scale than elements displayed on the remainder of the web page;
    receiving an indication of a first location on the web page;
    determining a first point on a first element of the web page associated with the first location;
    receiving an indication of a second location on the web page, at least one of the first location or the second location being selectable from within the zoom display area;
    determining a second point on a second element of the web page associated with the second location; and
    calculating a distance between the first point and the second point, the distance being displayable on the web page.

2. The computer-implemented method as recited in claim 1, further comprising:
    determining the first element based, at least in part, on whether the first element is positioned on the web page within a predetermined distance from the first location; and
    determining the first point on the first element based, at least in part, on whether the first point is positioned on the first element within a predetermined distance from the first location.

3. The computer-implemented method as recited in claim 2, wherein the first point on the first element is an end point of a feature of the first element.

4. The computer-implemented method as recited in claim 1, wherein the first element and the second element are a same element, and wherein the first point and the second point are on the same element.

5. The computer-implemented method as recited in claim 1, wherein the first element and the second element are a same element, and wherein the first point and the second point are on different features of the same element.

6. The computer-implemented method as recited in claim 1, further comprising a graphical ruler displayable on the web page to connect the first point and the second point.

7. The computer-implemented method as recited in claim 6, wherein the graphical ruler includes tick marks.

8. The computer-implemented method as recited in claim 6, wherein the graphical ruler is displayable in a user-selected color.

9. The computer-implemented method as recited in claim 6, wherein the graphical ruler includes graphical points that represent the first point and the second point.

10. The computer-implemented method as recited in claim 1, wherein receiving the indication of the first location includes receiving a selection input while a pointer is displayed at the first location.

11. The computer-implemented method as recited in claim 10, wherein the selection input is a mouse click input.

12. A system, comprising:
    at least a memory and a processor configured to implement an application and a ruler utility;
    the application configured to display a web page; and
    the ruler utility configured to:
        initiate activation of a zoom display area to display a section of the web page at a greater magnification level than a remainder of the web page;
        zoom a magnification level of one or more elements displayed in the zoom display area to the greater magnification level which displays the one or more elements in the zoom display area at a different scale than elements displayed on the remainder of the web page;
        enable indications of two locations on the web page, the zoom display area further configured to enable an accurate indication of at least one of the two locations when selected from within the zoom display area;
        determine, for each of the two locations, a point on an element of the web page proximate a respective one of the two locations; and
        calculate a distance between the two locations, the distance being displayable on the web page.

13. The system as recited in claim 12, wherein the ruler utility is configured to determine the point on the element based, at least in part, on whether the element is within a predetermined distance from a respective one of the two locations.

14. The system as recited in claim 13, wherein the predetermined distance is ranged from one to ten pixels.

15. The system as recited in claim 12, wherein each point that is proximate a respective one of the two locations is on different elements.

16. The system as recited in claim 12, wherein the application is a web browser.

17. The system as recited in claim 16, wherein the ruler utility is incorporated as a component of the web browser.

18. A computer-implemented method, comprising:

initiating activation of a zoom display area to display a section of a web page at a greater magnification level than a remainder of the web page;

zooming a magnification level of one or more elements displayed in the zoom display area to the greater magnification level which displays the one or more elements in the zoom display area at a different magnification level than elements displayed on the remainder of the web page;

receiving selections of locations on the web page, the locations being selectable from within the zoom display area;

determining one or more elements on the web page that are proximate the locations;

snapping to points on an element proximate at least two of the locations, each point being a non-zero distance from a respective one of the at least two locations;

calculating a distance between the points that correlate to the at least two locations; and initiating a display of the distance on the web page.

19. The computer-implemented method as recited in claim 18, further comprising snapping each of the points that correlate to the at least two locations to a feature on different elements.

20. The computer-implemented method as recited in claim 18, further comprising displaying a graphical ruler connecting the points on the web page.

* * * * *